United States Patent [19]

McGrath, Jr.

[11] Patent Number: 4,934,780
[45] Date of Patent: Jun. 19, 1990

[54] CONSTANT DEVIATION SCANNING APPARATUS

[75] Inventor: John F. McGrath, Jr., Arlington, Mass.

[73] Assignee: Compugraphic Corporation, Wilmington, Mass.

[21] Appl. No.: 290,353

[22] Filed: Dec. 27, 1988

Related U.S. Application Data

[62] Division of Ser. No. 35,974, Apr. 8, 1987, Pat. No. 4,793,672.

[51] Int. Cl.$^5$ .......................... G02B 26/10; G02B 5/04
[52] U.S. Cl. ...................................... 350/6.4; 350/286
[58] Field of Search ................. 350/6.4, 286, 6.1, 6.2, 350/287, 489

[56] References Cited

U.S. PATENT DOCUMENTS 3,725,817  3/1973  Nolan .................................... 350/484
4,475,787  10/1984  Starkweather ....................... 350/6.4

OTHER PUBLICATIONS

"Optical Components Descriptions", Klinger Scientific Apparatus Corp., 83-45 Parsons Blvd., Jamaica, N.Y., 11432.

Primary Examiner—Bruce Y. Arnold
Assistant Examiner—Ronald M. Kachmarik
Attorney, Agent, or Firm—Richard J. Birch

[57] ABSTRACT

A constant deviation beam scanning apparatus having a rotatable beam deflector with at least one reflective surface thereof lying in a plane that intersects the axis of rotation at an acute angle. One embodiment utilizes a rotatable, truncated, n-sided pyramidal mirror with at least one planar reflective scanning segment located on one of the n-sides of the pyramidal mirror. The pyramidal mirror's truncation surface lies in a plane normal to the mirror's rotation axis and contains at least one planar reflective segment. A constant deviation reflector having two reflective surfaces is positioned so that a collimated beam of light reflected by the truncation surface reflective segment is reflected by one of the constant deviation reflective surfaces to the other reflective surface and then to the at least one planar reflective scanning segment of the pyramidal mirror.

2 Claims, 4 Drawing Sheets

CONSTANT DEVIATION SCANNING APPARATUS

This is a divisional of co-pending application Ser. No. 035,974, filed on Apr. 8, 1987, now U.S. Pat. No. 4,793,672.

BACKGROUND OF THE INVENTION

The present invention relates to optical beam scanning apparatus and, more particularly, to a wobble compensated beam scanning apparatus having a rotatable beam deflector with at least one reflective surface that lies in a plane which intersects the axis of rotation at an acute angle.

Optical beam scanners having a rotating, pyramidal mirror for scanning a writing or reading beam across a media-containing image/object plane are well known in the art. Representative examples of such pyramidal mirror scanning systems are found in a variety of the now ubiquitous "laser printers" and "laser scanners". The pyramidal mirrors used in such printers and scanners can be divided into two major categories: one in which the planes of the reflecting surfaces are parallel to the rotational axis of the pyramidal mirror; and, two, those in which the planes of the reflecting surfaces of the pyramidal mirror intersect the mirrors' rotation axis at an acute angle.

The quality of the output media from the printers and scanners depends in a large measure upon the positional accuracy of the scanning beam. In order to maintain the desired degree of beam placement accuracy, relative tight positional requirements are imposed upon both the reflecting surfaces of the pyramidal mirror and the rotation axis of the mirror.

The rotation axis of the pyramidal mirrors in both categories must remain "true" with respect to the optical system. If the rotation axis departs from the "true" rotation axis, a cross-scan error is introduced in the optical system. The departure of the mirrors' rotation axis from the "true" rotation axis is caused by "wobble" in the scanning apparatus. The wobble can be either random or fixed or a combination thereof. Random wobble is introduced by loose spin motor bearings, non-spherical ball bearings and the like, while the fixed wobble is introduced when the rotation axis of the pyramidal mirror is misaligned with respect to the "true" rotation axis. The wobble induced cross-scan deviation must be compensated for in order to achieve a high degree of addressability in the image/object plane.

One embodiment of the present invention is directed to wobble compensated beam scanners employing pyramidal mirrors of the second category in which the planes of the reflective scanning segments intersect the axis of rotation at an acute angle.

The use of a rotating, pyramidal scanner is old in the art. See U.S. Pat. No. 3,487,224, issued Dec. 30, 1969 for a "Scanner Which Utilizes A Pair Of Time-Shared Apertures". Truncation of the rotating pyramidal reflective scanning element is shown in the following U.S. Pat. No.: 3,866,038, issued Feb. 11, 1975 for "Apparatus For Measuring Surface Flatness"; U.S. Pat. No. 4,268,110, issued May 19, 1981 for "Facet Angle Corrector For Multi-Faceted Optical Scanner"; U.S. Pat. No. 4,312,590 issued Jan. 26, 1982 for "Optical Scanner And System For Laser Beam Exposure Of Photo Surfaces"; and, U.S. Pat. No. 4,323,307 issued Apr. 6, 1982 for "Light Beam Scanning Apparatus".

The 4,312,590 and 4,323,307 patents disclose a wobble compensated scanner utilizing a rotating, truncated pyramidal reflector with two roof mirrors. The truncated portion of the pyramidal reflector is not employed either as a reflecting surface or as an active element in the optical system. In each patent, wobble compensation is achieved only through multiple reflections between the rotating, truncated pyramidal mirror sides and the roof mirrors.

It is accordingly a general object of the present invention to provide an improved wobble compensating beam scanner.

It is a specific object of the invention to provide a wobble compensating beam scanner having at least one reflective surface that lies in a plane that intersects the axis of rotation at an acute angle.

It is another object of the invention to provide a beam scanner utilizing a rotating, truncated pyramidal mirror with the truncation surface acting as a wobble compensating optical element in the scanner.

It is still another object of the present invention to provide a wobble compensated beam scanning apparatus having a compact form factor for use in laser beam printers and scanners.

It is a feature of the invention that multiple scans of the read/write media can be achieved during a single rotation of the wobble compensated rotating, truncated pyramidal mirror.

It is another feature of the invention that the reflecting characteristics of the reflecting surfaces of the pyramidal mirror can be varied to accommodate intensity variations in the laser beam light source.

SUMMARY OF THE INVENTION

The beam scanning apparatus of the present invention employs a rotating, truncated pyramidal mirror having n-sides of which at least one side contains a planar reflective scanning segment. The truncation surface of the mirror contains a planar reflective segment. A constant deviation reflector comprising two reflective surfaces is positioned so that a collimated light beam reflected by the truncation surface planar reflective segment is reflected by one of the reflective surfaces of the constant deviation reflector to the other surface thereof and then to the planar reflective scanning segment located on one of the n-sides of the rotatable, truncated pyramidal mirror. A spin motor is used to rotate the mirror. If the axis of rotation departs from the desired "true" rotation axis, the wobble, either random and/or fixed produced thereby, is compensated by the action of the combination of the truncation surface planar reflective segment located on the truncation surface and the constant deviation reflector. An F-theta scan lens focuses the beam onto an image/object plane.

BRIEF DESCRIPTION OF THE DRAWINGS

The objects and features of the invention described above will best be understood from a detailed description of a preferred embodiment thereof, selected for purposes of illustration, and shown in the accompanying drawings in which.

DETAILED DESCRIPTION OF THE INVENTION

Figure 1:
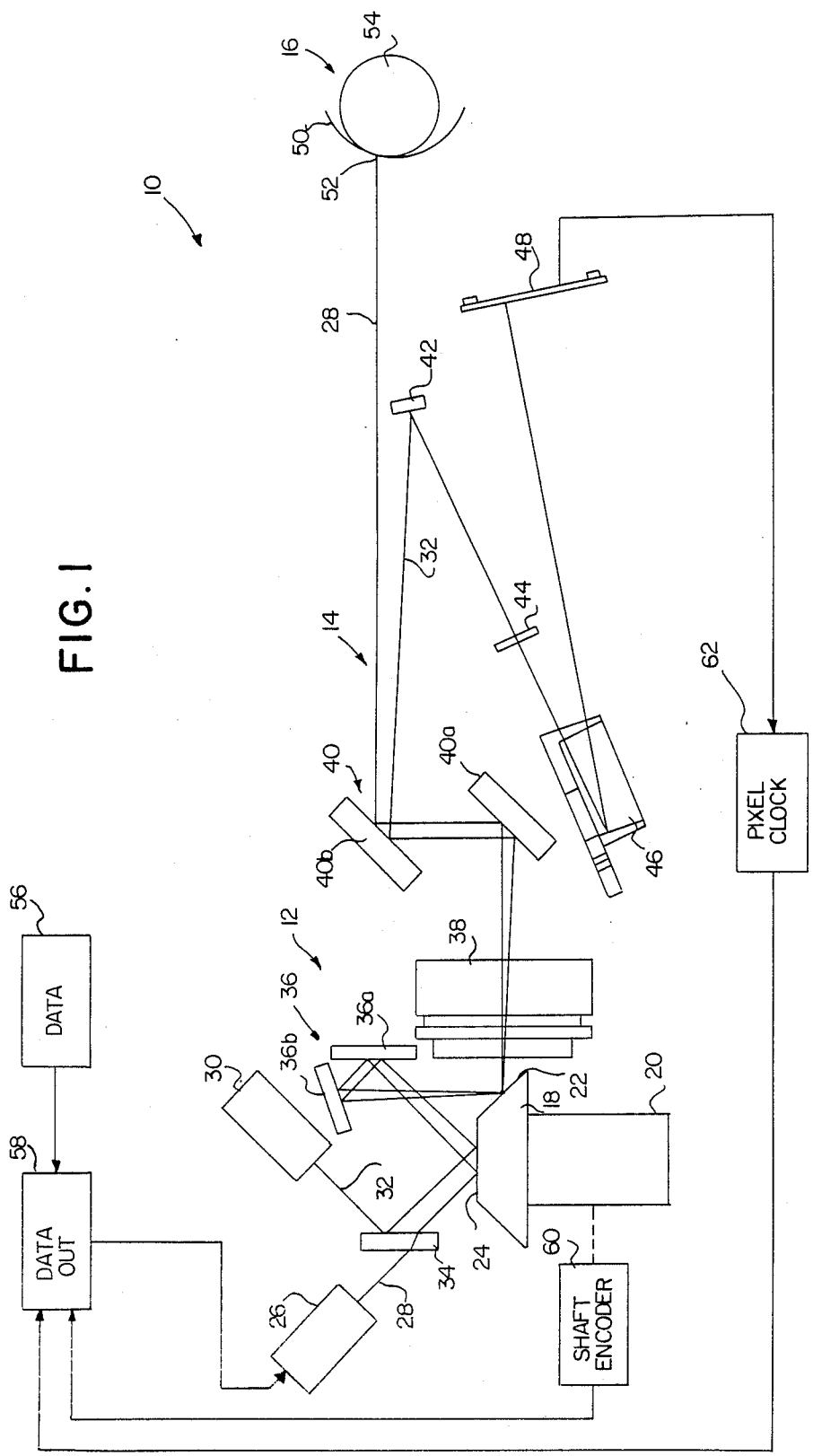
FIG. 1 is a diagrammatic view in partial block form showing an imaging system incorporating the wobble compensated beam scanning apparatus.

Turning now to the drawings, and particularly to FIG. 1 thereof, there is shown a scanning system indicated generally by the reference numeral 10 which comprises three major components: a beam scanner indicated generally by the reference numeral 12, write/read folding optics indicated generally by the reference numeral 14 and a media station indicated generally by the reference numeral 16. Each of these major components will be discussed below in greater detail.

The beam scanner 12 comprises a rotatable, truncated, pyramidal mirror 18 driven by a spin motor 20. The rotatable, truncated, pyramidal mirror has at least one planar reflective scanning segment 22, the plane of which intersects the rotation axis of the truncated pyramidal mirror 18 at an acute angle. In addition, the rotating truncated, pyramidal mirror 18 has a wobble compensating planar reflective segment 24 located in the plane of the truncation surface of the mirror 18.

A frequency modulated laser diode 26 generates a write beam 28. Similarly, a reference beam laser diode 30 generates a reference beam 32. The write beam 28 and reference beam 32 are directed by means of beam splitter 34 to the truncation surface planar reflective segment 24 from which they are reflected to a constant deviation stationary mirror pair indicated generally by the reference numeral 36 and comprising mirrors 36a and 36b. After reflection from mirrors 36a and 36b, the two beams impinge upon the planar reflective scanning segment 22 of the rotating truncated pyramidal mirror 18 and, after reflection from this surface, the beams pass through a focusing scan lens 38 of the f-theta type.

The write and read beams 28 and 32, respectively, exiting from scan lens 38 are directed through a periscope mirror pair, indicated generally by the reference numeral 40, and comprising mirrors 40a and 40b. At this point, the reference beam 32 is directed to fold mirror 42 and then through a reference beam grating encoder 44 to a curved mirror 46. The reference beam 32 is reflected from the curved mirror 46 to a photo diode 48. The function of the photo diode 48 will be discussed below in connection with the modulation of the frequency modulated write beam laser diode 26.

After reflection from mirror 40a, the write beam 28 impinges upon a media 50 at an image/object plane 52. The scan direction of the write beam 28 is normal to the plane of FIG. 1, i.e., the beam is scanned in and out of the drawing. A transport system for media 50 is representatively shown by means of a drive roll 54.

It has been mentioned previously that the write beam laser diode 26 is frequency modulated. The modulating signal represents stored data 56 that is fed to the write beam laser diode 26 through a data out control circuit 58. The data out circuit 58 receives a control signal input from shaft encoder 60 and from pixel clock 62. In order to time the modulation of laser diode 26 with respect to the position of the rotating at least one planar reflective segment 22, the shaft encoder 60 produces an enable/disable signal for data out circuit 58 as a function of the angular position of the rotating pyramidal mirror 18 with respect to a fiducial (not shown).

The output from photo diode 48 is used to set and update pixel clock 62 to control the rate of data flow from data source 56 through the data out circuit 58 to the write beam laser diode 26. The encoder 44, photo diode 48 and pixel clock 62 thus provide a velocity compensation for changes in the velocity of the write beam 28.

Figure 2:
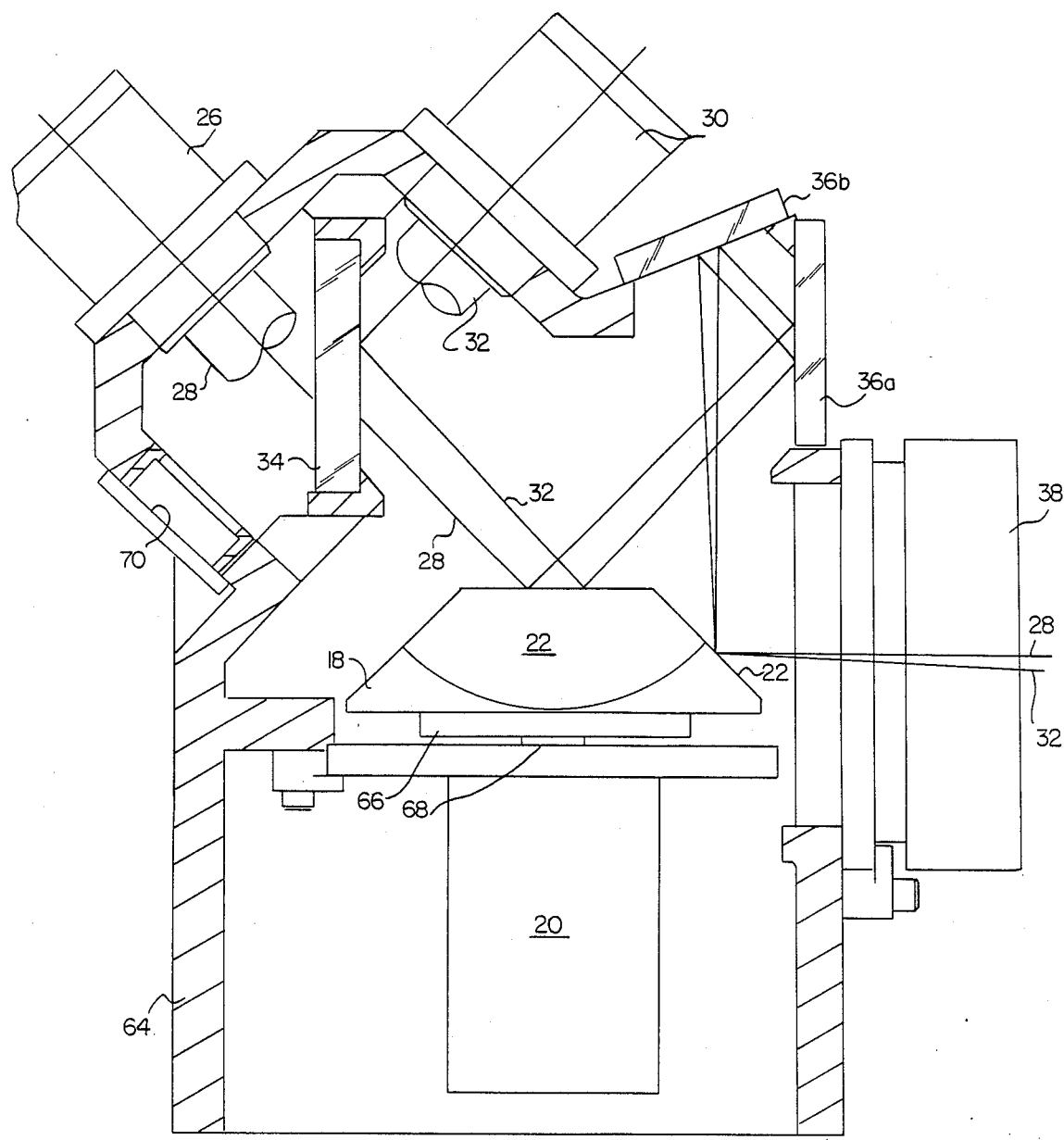
FIG. 2 is a view in side elevation and partial section showing in enlarged form the beam scanning apparatus illustrated in FIG. 1.
Figure 3:
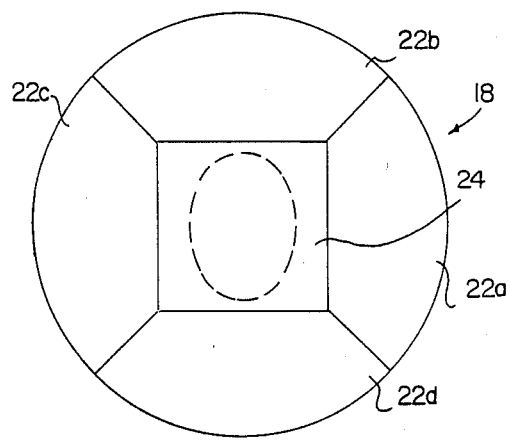
FIG. 3 is a plan view of the rotating, truncated pyramidal mirror shown in FIG. 2.

Referring to FIGS. 2 and 3, the beam scanner 12 shown in FIG. 1 is depicted in enlarged form and greater detail in FIG. 2 and the rotating truncated pyramidal mirror 18 of FIG. 1 is shown in enlarged form and greater detail in FIG. 3. The optical and mechanical components of the beam scanner 12 are mounted in and with respect to a housing 64. As seen in FIG. 2, the rotating, truncated pyramidal mirror 18 is mounted on a suitable mounting plate 66 that in turn is secured to shaft 68 of the spin motor 20. A light trap 70 is provided to trap light passing through wedge beam splitter 34 from the reference beam laser diode 30.

It can be seen in both FIGS. 1 and 2 that the write beam 28 from write beam laser diode 26 passes in transmission through the beam splitting wedge 34 while the reference beam 32 is reflected therefrom. Since the write beam passes through the beam splitter 34 in transmission, vibration will not produce an error in the write beam.

Referring to FIG. 3, the rotating, truncated pyramidal mirror 18 has at least one reflective scanning facet, e.g., 22a. If desired a plurality of reflective scanning facets can be located on the truncated, pyramidal mirror as indicated by the reference numerals 22b, 22c and 22d. Depending upon the number of reflective scanning segments, a corresponding number of scanning lines can be produced at the image/object plane 52 for one rotation of the truncated, pyramidal mirror 18.

If more than one reflective scanning segment 22 is employed on the rotating, truncated pyramidal mirror 18, the reflective scanning segments can have the same or differing degrees of reflectivity. By employing differing degrees of reflectivity for the reflective scanning segments 22, it is possible to accommodate variations in the intensity of the writing beam laser diode 26 if the diode is replaced. Since each reflecting scanning segment 22 can have a different degree of reflectivity, this capability, in conjunction with the timing provided by a shaft encoder 60, the output from photo diode 48 and pixel clock 62 can be used to control the intensity of the write beam 28 at the image/object plane 52.

Figure 4:
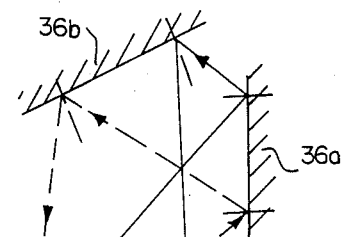
FIG. 4 is an enlarged diagrammatic view in side elevation illustrating the wobble compensating action of the beam scanning apparatus.

The wobble compensation provided by the rotating truncated pyramidal mirror 18 is illustrated in enlarged form in FIG. 4. The solid arrowed lines in FIG. 4 represent one position of the write beam 28 with respect to the wobble compensating reflective facet 24 and the reflective scanning facet 22. If the rotating, truncated pyramidal mirror 18 "wobbles" to a position shown by the dashed lines in FIG. 4, the write beam 28 will be reflected from the wobble compensating reflective facet 24 as shown by the dashed arrowed lines in FIG. 4. It can be seen from FIG. 4 that both of the write beams identified as 28' and 28" reflected from the reflective scanning segment 22 are parallel to each other and, therefore, will be focused by the scanning lens 38 at the same point on image/object plane 52.

Figure 5:
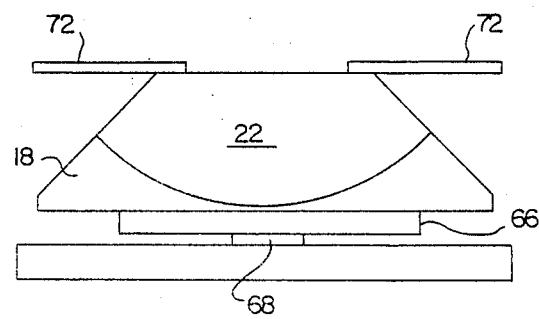
FIG. 5 is a view similar to that of FIG. 2 depicting the use of a filter wheel in conjunction with the rotating, truncated pyramidal mirror.
Figure 6:
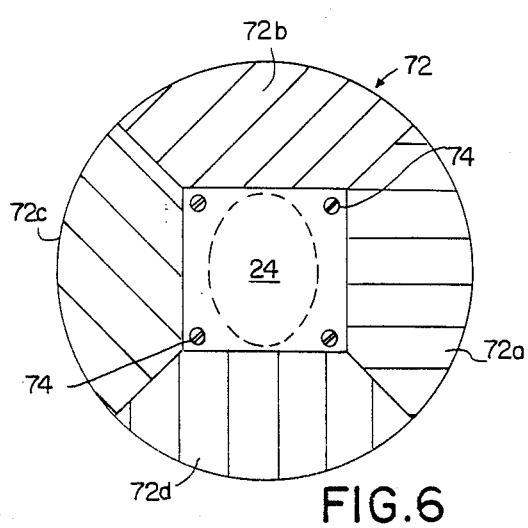
FIG. 6 is a plan view showing the filter wheel illustrated in FIG. 5.

Referring to FIGS. 5 and 6, there is shown in side view (FIG. 5) and plan view (FIG. 6) a filter wheel 72 that is secured to the truncated surface 24 of the pyramidal mirror 18 by means of fasteners 74. The filter wheel 72 contains one or more filter segments represented by the reference numerals 72a-72d in FIG. 6. The filter element or elements 72a-72d can be used to perform a variety of functions. For example, if the filter elements comprise neutral density filters of varying strength, the filter wheel 72 can be used to compensate for variations in the intensity of the write beam laser diode 26. If a polychromatic light source is used to generate the write beam 28, the filter wheel 72 can include color filters to permit additive or subtractive color beam illumination of a photosensitive medium 50 at the image/object plane 52. If the beam scanning system 10 is used to read a media 50 at the image/object plane 52, the color filter wheel 72 will provide the appropriate color scanning images to a photosensitive receiver (not shown) which replaces the write beam laser diode 26.

Figure 7:
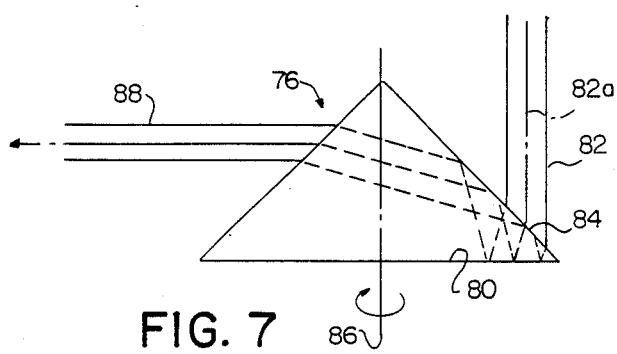
FIG. 7 is a view in side elevation showing the use of a right prism as the rotating beam deflector.
Figure 8:
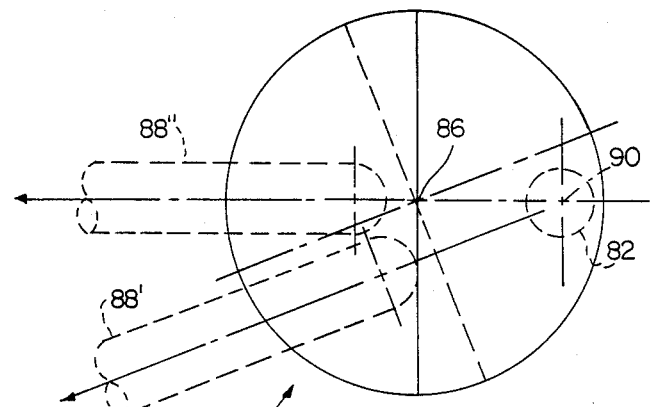
FIG. 8 is a plan view of the rotating prism depicted in FIG. 7.
Figure 9:
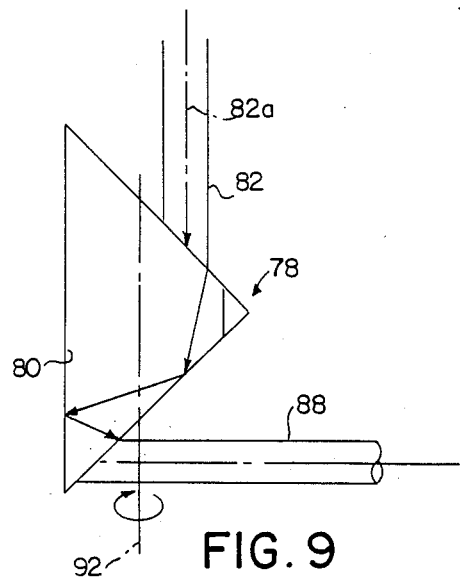
FIG. 9 is a view in side elevation showing the use of a right angle prism in which rotation of the prism produces a 360° scan in a plane perpendicular to the axis of rotation; and, FIG. 10 is a plan view of the prism of FIG. 9.
Figure 10:
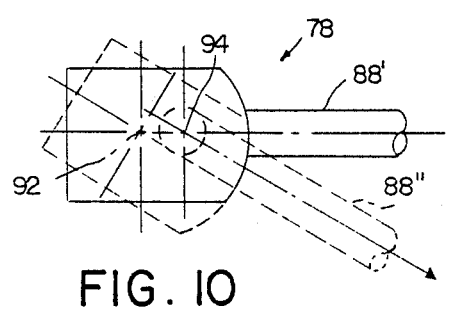

Looking now at FIGS. 7 through 10, there is shown further embodiments of a constant deviation scanner utilizing a constant deviation prism indicated generally by the reference numeral 76 in FIGS. 7 and 8 and by the reference numeral 78 in FIGS. 9 and 10.

The prism 76 comprises a right angle prism in which the hypotenuse 80 is silvered in order to obtain internal reflection. A collimated beam of incident radiation 82 illuminates prism face 84 and passes through the face and is reflected from the silvered surface of hypotenuse 80 and back to face 84 from which it is totally internally reflected. Given the symmetry of prism 76, if the prism is rotated about an axis 86 that is perpendicular to the hypotenuse 80 and bisects the 90 degree apex of the prism, the exiting beam 88 will scan in a horizontal plane (if the axis of rotation 86 is viewed as vertical) twice per revolution of the prism.

Referring to the FIG. 8 plan view of prism 76 shown in FIG. 7, it can be seen that the apparent center line of rotation 90 of the scanned exiting beam 88' and 88" appears to coincide with the center line 82a of the incident beam 82 and not the mechanical axis of rotation 86.

If the positions of the incident and exiting beams 82 and 88, respectively, are exchanged and a new axis of rotation 92 is made parallel to the center line 82a of the new incident beam as shown in FIGS. 9 and 10, rotation of the prism about axis 92 will cause the exiting beam 88' and 88" to scan continuously through 360 degrees in a plane perpendicular to the axis of rotation 92. The center of optical rotation 94 is again coincident with the center line of 82a of the incident beam 82. Although only one useful scan is generated per rotation of the prism 78 in the configuration shown in FIGS. 9 and 10, it is possible to mount a scanning lens much closer to the optical center of rotation 94 thereby significantly decreasing both the size and cost of the focusing scan lens.

Having described in detail embodiments of my invention, it will now be obvious to those skilled in the art that numerous modifications can be made therein without departing from the scope of the invention as defined in the following claims.

What I claim is:

1. A beam scanning apparatus comprising:
a rotatable right angle prism having first and second faces and a hypotenuse side, said hypotenuse side having an inwardly facing reflective segment;
means for rotating said right angle prism about an axis that is normal to the hypotenuse side and bisects the 90° apex of the prism; and,
means for impinging a beam of collimated light on the first face of said prism so that the light beam passes through the first face, is reflected by the inwardly facing reflective segment of the hypotenuse side and then totally inwardly reflected by said first face before exiting the prism through the second face.

2. A beam scanning apparatus comprising:
a rotatable right angle prism having first and second faces and a hypotenuse side, said hypotenuse side having an inwardly facing reflective segment;
means for impinging a beam of collimated light on the first face of said prism so that the light beam passes through the first face, is totally inwardly reflected by the second face of the prism and then by the inwardly facing reflective segment of the hypotenuse side before exiting the prism through said second face; and,
means for rotating said right angle prism about an axis parallel to a collimated light beam that impinges on the first face of said prism.

* * * * *